(12) United States Patent
Oshima et al.

(10) Patent No.: US 10,476,073 B2
(45) Date of Patent: Nov. 12, 2019

(54) PRODUCTION PROCESS FOR CARBON-COATED SILICON MATERIAL

(71) Applicant: KABUSHIKI KAISHA TOYOTA JIDOSHOKKI, Kariya-shi, Aichi (JP)

(72) Inventors: Hiroki Oshima, Kariya (JP); Takashi Mohri, Kariya (JP); Nobuhiro Goda, Kariya (JP); Masataka Nakanishi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 321 days.

(21) Appl. No.: 15/506,825

(22) PCT Filed: Aug. 4, 2015

(86) PCT No.: PCT/JP2015/003927
§ 371 (c)(1),
(2) Date: Feb. 27, 2017

(87) PCT Pub. No.: WO2016/031146
PCT Pub. Date: Mar. 3, 2016

(65) Prior Publication Data
US 2017/0256793 A1    Sep. 7, 2017

(30) Foreign Application Priority Data
Aug. 27, 2014   (JP) .................. 2014-172924

(51) Int. Cl.
*H01M 4/36* (2006.01)
*H01M 4/38* (2006.01)
(Continued)

(52) U.S. Cl.
CPC ............. *H01M 4/366* (2013.01); *B01J 13/04* (2013.01); *C01B 32/05* (2017.08); *C01B 33/021* (2013.01);
(Continued)

(58) Field of Classification Search
CPC ........ B01J 13/04; C01B 32/05; C01B 33/021; C01P 2004/61; C01P 2004/80;
(Continued)

(56) References Cited

U.S. PATENT DOCUMENTS

2003/0215711 A1   11/2003   Aramata et al.
2015/0307362 A1   10/2015   Sugiyama et al.
2017/0012282 A1    1/2017   Kondo et al.

FOREIGN PATENT DOCUMENTS

JP   3952180 B2      8/2007
JP   2012-059509 A   3/2012
(Continued)

OTHER PUBLICATIONS

T. Okubo, T. Yamada, M. Saito, C. Yodoya, A. Kamei, M. Hirota, T. Takenaka, A. Tasaka, M. Inaba. Carbon Coating of Si Thin Flakes and Negative Electrode Properties in Lithium-Ion Batteries, Electrochemistry (Tokyo, Japan) (2012), 80(10), 720-724.*

A. Huczko, H. Lange, G. Chojecki, S. Cudzito, Y. Q. Zhu, H. W. Kroto, D. R. M. Walton. Synthesis of Novel Nanostructures by Metal-Polytetrafluoroethene Thermolysis, J. Phys. Chem. B 2003, 107, 2519-2524.*

(Continued)

*Primary Examiner* — Carlos Barcena
(74) *Attorney, Agent, or Firm* — Sughrue Mion, PLLC

(57) ABSTRACT

A production process for carbon-coated silicon material includes the step of: heating CaSi2 and a halogen-containing polymer at a temperature being a carbonization temperature or more of the halogen-containing polymer in a state where the CaSi2 and the halogen-containing polymer coexist.

16 Claims, 6 Drawing Sheets

(51) Int. Cl.
  *H01M 4/587* (2010.01)
  *H01M 10/0525* (2010.01)
  *C01B 33/021* (2006.01)
  *B01J 13/04* (2006.01)
  *C01B 32/05* (2017.01)
  *H01M 4/02* (2006.01)

(52) U.S. Cl.
  CPC ........... *H01M 4/386* (2013.01); *H01M 4/587* (2013.01); *H01M 10/0525* (2013.01); *C01P 2004/61* (2013.01); *C01P 2004/80* (2013.01); *C01P 2006/40* (2013.01); *H01M 2004/021* (2013.01)

(58) Field of Classification Search
  CPC ........... C01P 2006/40; H01M 10/0525; H01M 2004/021; H01M 4/366; H01M 4/386; H01M 4/587
  See application file for complete search history.

(56) References Cited

FOREIGN PATENT DOCUMENTS

| | | | |
|---|---|---|---|
| JP | 2012-159509 A | 3/2012 | |
| JP | 2014-060139 A | 4/2014 | |
| WO | WO-2013155397 A1 * | 10/2013 | ............ H01M 4/386 |
| WO | 2014/080608 A1 | 5/2014 | |
| WO | 2015/114692 A1 | 8/2015 | |

OTHER PUBLICATIONS

Communication dated Jan. 9, 2018, from the Japanese Patent Office in counterpart application No. 2016-544928.
International Search Report for application No. PCT/JP2015/003927 dated Oct. 20, 2015.
Written Opinion for application No. PCT/JP2015/003927 dated Oct. 20, 2015.

* cited by examiner

PRODUCTION PROCESS FOR CARBON-COATED SILICON MATERIAL

CROSS REFERENCE TO RELATED APPLICATIONS

This application is a National Stage of International Application No. PCT/JP2015/003927, filed on Aug. 4, 2015, which claims priority from Japanese Patent Application No. 2014-172924, filed on Aug. 27, 2014, the contents of all of which are incorporated herein by reference in their entirety.

TECHNICAL FIELD

The present invention relates to a production process for carbon-coated silicon material.

BACKGROUND ART

Silicon materials have been known to be used as a constituent element for semiconductors, solar batteries, secondary batteries, and the like. Hence, studies on silicon materials have been carried out actively.

For example, Patent Application Publication No. 1 sets forth a silicon composite in which silicon oxide is coated with carbon by thermal CVD, and sets forth moreover a lithium-ion secondary battery which is furnished with the silicon composite as a negative-electrode active material.

Moreover, in Patent Application Publication No. 2, the present inventors reported the following: reacting $CaSi_2$ with an acid to synthesize a lamellar silicon compound of which the major component is polysilane from which Ca has been removed; heating the lamellar silicon compound at 300° C. or more to produce a silicon material from which hydrogen has broken away; and a lithium-ion secondary battery which is furnished with the silicon material as an active material.

In addition, in Patent Application Publication No. 3, the present inventors reported the following: reacting $CaSi_2$ with an acid to synthesize a lamellar silicon compound of which the major component is polysilane from which Ca has been removed; heating the lamellar silicon compound at 300° C. or more to produce a silicon material from which hydrogen has broken away; furthermore, producing a carbon/silicon composite in which the silicon material has been coated with carbon; and a lithium-ion secondary battery which is furnished with the composite as an active material.

PATENT LITERATURE

Patent Application Publication No. 1: Japanese Patent Gazette No. 3952180;
Patent Application Publication No. 2: WO2014/080608; and
Patent Application Publication No. 3: Japanese Patent Application No. 2014-037833

SUMMARY OF THE INVENTION

Technical Problem

As described above, various silicon materials have been studied energetically. Note herein that, in using a silicon material as an active material for battery, saying is possible that using a carbon-coated silicon material in which the silicon material is coated with carbon is preferable in order to upgrade an electrically-conducting property of the silicon material. Moreover, as set forth in Patent Application Publication No. 1, adopting a thermal CVD method has been known as a method of coating the silicon material with carbon.

However, in order to obtain a carbon-coated silicon material by the method disclosed in Patent Application Publication No. 3, the following steps are essential: a step of reacting $CaSi_2$ with an acid to synthesize a lamellar silicon compound from which Ca has been removed; a step of heating the lamellar silicon compound at 300° C. or more to produce a silicon material from which hydrogen has broken away; and furthermore a step of producing a carbon-coated silicon material in which the silicon material has been coated with carbon. Accordingly, from an industrial viewpoint, saying is not necessarily possible that the method is efficient.

The present invention is made in view of such circumstances. An object of the present invention is to provide a production process enabling a carbon-coated silicon material to be produced through a less number of steps.

Solution to Problem

The present inventors carefully considered the respective steps of the production process according to Patent Application Publication No. 3. As a result, the present inventors came to the following conclusions. First of all, at the step of synthesizing a lamellar silicon compound, a hydrohalic acid or halogen ion is needed within a reaction system to break away Ca from $CaSi_2$. That is, at the step, a hydrohalic acid or halogen ion is allowed to exist within a reaction system, regardless of the forms. Next, at the step of producing a silicon material, hydrogen, and the like, is permitted to break away from a lamellar silicon compound of which the major component is polysilane, and so on, under a heating condition, for the purpose of obtaining a silicon material from the lamellar silicon compound. That is, giving a 300° C. -or-more heating environment to a lamellar compound is permitted. Moreover, at the step of producing a carbon-coated silicon material in which carbon and silicon have been integrated, a carbon source of which the carbonization degree is high is allowed to exist within a system under a heating condition where the carbon source carbonizes, for the purpose of obtaining the carbon-coated silicon material.

Note herein that the present inventors thought of such an idea that letting a member or substance, which releases a hydrohalic acid or halogen ion under a heating condition and which is capable of making the carbon source, exist together with $CaSi_2$ would make the targeted carbon-coated silicon material obtainable through a single-stage production step. Thus, the present inventors completed the present invention based on such a thought.

That is, a production process for carbon-coated silicon material according to the present invention comprises the step of:

heating $CaSi_2$ and a halogen-containing polymer at a temperature being a carbonization temperature or more of the halogen-containing polymer in a state where the $CaSi_2$ and the halogen-containing polymer coexist.

Advantageous Effects of the Invention

A production process for carbon-coated silicon material according to the present invention (hereinafter, simply referred to sometimes as "a production process according to the present invention") enables a carbon-coated silicon material to be provided through a shortened step. FIG. 1 illustrates a production process according to the present invention and a specific production process for carbon-coated silicon material set forth in Patent Application Publication No. 3, both of which are shown as a flow chart, respectively. As illustrated in FIG. 1, the production process according to the present invention enables the production process set forth in Patent Application Publication No. 3 to be performed through a single step.

DESCRIPTION OF THE EMBODIMENTS

Figure 1:
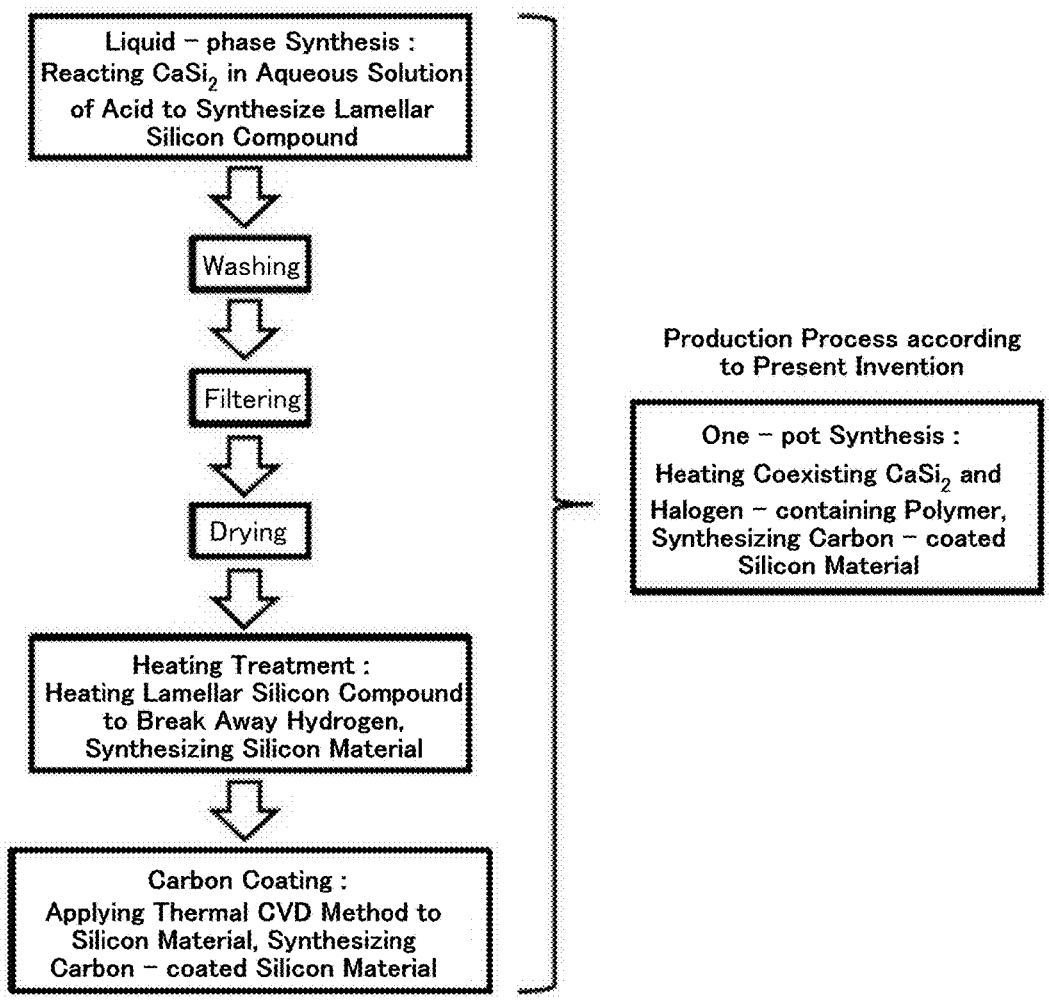
FIG. 1 is flow charts one of which illustrates a production process according to the present invention, and the other one of which illustrates a specific production process for carbon-coated silicon material set forth in Patent Application Publication No. 3.

Some of best modes for executing the present invention are hereinafter explained. Note that, unless otherwise specified, numerical ranges, namely, "from 'x' to 'y'" set forth in the present description, involve the lower limit, "x," and the upper limit, "y" in the ranges. Moreover, the other numerical ranges are composable by arbitrarily combining any two of the upper-limit values and lower-limit values, involving the other numeric values enumerated in examples as well. In addition, selecting numeric values arbitrarily from within the ranges of numeric values enables other upper-limit and lower-limit numerical values to be set.

A production process for carbon-coated silicon material according to the present invention comprises the step of heating $CaSi_2$ and a halogen-containing polymer at a temperature being a carbonization temperature or more of the halogen-containing polymer in a state where the $CaSi_2$ and the halogen-containing polymer coexist. Note hereinafter that a carbon-coated silicon material produced by the production process according to the present invention is referred to sometimes as "a carbon-coated siliconmaterial according to the present invention."

Explained below is a reaction mechanism of the production process according to the present invention when polyvinyl chloride is adopted as the halogen-containing polymer.

First of all, the polyvinyl chloride is decomposed by heating to release hydrogen chloride.

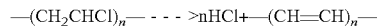

Next, $CaSi_2$ acts on the hydrogen chloride released as aforementioned to turn into a lamellar silicon compound expressed by $Si_6H_6$.

Then, since the reactants are put under a heating condition, hydrogen atoms of $Si_6H_6$ break away to make silicon obtainable.

Moreover, the $(CH=CH)_n$, a decomposition product of the polyvinyl chloride, carbonizes in such a heating condition as being the carbonization temperature or more. Since the silicon, and carbides resulting from the $(CH=CH)_n$ coexist on the occasion, a carbon-coated silicon material in which the silicon and carbon has been integrated is obtainable.

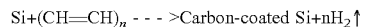

Hereinafter, explanations are made in detail on the production process according to the present invention.

In general, $CaSi_2$ has a structure in which a Ca layer and an Si layer are laminated. Synthesizing the $CaSi_2$ by a publicly-known method is also allowable, and even adopting a commercially-available product is permissible. Preferable is pulverizing $CaSi_2$ to be used in the production process according to the present invention in advance. As a preferable average particle diameter of the $CaSi_2$, an average diameter falling within a range of from 0.1 to 50 µm is exemplifiable. Moreover, the following are exemplifiable: a more preferable average particle diameter falling within a range of from 0.3 to 20 µm; a much more preferable average particle diameter falling within a range of from 0.5 to 10 µm; or an especially preferable average particle diameter falling within a range of from one to five µm. Note that an "average particle diameter" in the present description means "$D_{50}$" when measured by a common laser-diffraction type particle-diameter-distribution measuring apparatus.

The halogen-containing polymer is allowed to be a polymer comprising halogen in the chemical structure. The reason is as described below. When the halogen-containing polymer is put under a heating condition of the production process according to the present invention, a hydrohalic acid and/or halogen molecules break away from the halogen-containing polymer. Moreover, negatively-charged halogen constituting the hydrohalic acid and/or halogen molecules reacts with Ca of the $CaSi_2$. That is, a desired reaction progresses, because being one of the halogen-containing polymers leads to making a supply source of the negatively-charged halogen. Note that, when the $CaSi_2$ reacts with the hydrohalic acid, $Si_6H_6$ and calcium halide are believed to generate; whereas silicon halide and calcium halide are believed to generate when the $CaSi_2$ reacts with the halogen molecules.

As for the halogen-containing polymer, giving is possible polymers having a monomer unit according to General Formula (1).

General Formula (1)

(Chemical Formula 1)

where "$R^1$" is a trivalent-or-more hydrocarbon group; each "X" is independently a halogen; and "n" is an integer of one or more.

For a hydrocarbon, saturated hydrocarbons, or unsaturated hydrocarbons are available. For a saturated hydrocarbon, linear or chain-like saturated hydrocarbons, and cyclic saturated hydrocarbons are available. For an unsaturated hydrocarbon, linear or chain-like unsaturated hydrocarbons, and cyclic unsaturated hydrocarbons are available.

Of the chemical structure of the "$R^1$," a chemical structure making a main chain of the monomer unit (i.e., a chemical structure involving carbon contributing to the polymerization reaction) is allowed to comprise any of the linear saturated hydrocarbons, cyclic saturated hydrocarbons, linear unsaturated hydrocarbons, and cyclic unsaturated hydrocarbons. As the chemical structure making a main chain of the monomer unit, giving the following specifically is possible: CH, $CH_2$—CH, CH=CH, cyclohexane rings, and benzene rings.

Of the chemical structure of the "$R^1$," another chemical structure bonding to the main chain of the monomer unit (hereinafter, referred to sometimes as a "sub-chain") is also allowed to comprise any of hydrogen, the linear saturated hydrocarbons, cyclic saturated hydrocarbons, linear unsaturated hydrocarbons, and cyclic unsaturated hydrocarbons. Moreover, the hydrogen of the respective hydrocarbons is even permitted to be substituted by the other elements, or by the other hydrocarbons.

The "X" is any of fluorine, chlorine, bromine, and iodine. When the "n" is two or more, each of the "X"s is also allowed to be an identical kind of the elements, or is even permitted to be different kinds of the elements. Moreover, the "X" is also allowed to bond directly to carbon making the main chain of the monomer unit, or is even permitted to bond to carbon in the sub-chain. An upper-limit number of the "n" is determined by the chemical structure of the "$R_1$."

The halogen-containing polymer is also allowed to comprise a single kind of the monomer unit according to General Formula (1), or is even permitted to comprise multiple kinds of the monomer unit according to General Formula (1). Moreover, the halogen-containing polymer is also allowed to comprise the monomer unit according to General Formula (1), and another monomer unit with the other chemical structure.

Note herein that the halogen-containing polymer preferably comprises the monomer unit according to General Formula (1) alone, because adopting a halogen-containing polymer of which the halogen mass percentage is much is believed to result in progressing the desired reaction more efficiently.

A molecular weight of the halogen-containing polymer falls preferably within a range of from 1,000 to 1,000,000, more preferably within a range of from 1,000 to 500,000, or much more preferably within a range of from 3,000 to 100,000, by number average molecular weight. When expressing the halogen-containing polymer in terms of the polymerization degree, a preferable polymerization degree falls within a range of from five to 100,000, a more preferable polymerization degree falls within a range of from 10 to 50,000, or a much more preferable polymerization degree falls within a range of from 100 to 10,000.

Of the monomer unit according to General Formula (1), one of the suitable monomer units is shown by following General Formula (2).

General Formula (2)
(Chemical Formula 2)

General Formula (2)

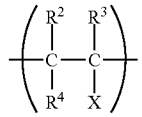
(Chemical Formula 2)

where each of "$R^2$," "$R^3$" and "$R^4$" is independently at least one member selected from the group consisting of monovalent hydrocarbon groups, halogen-substituted hydrocarbon groups, hydrogen and halogens; and "X" is a halogen.

Explanations on the hydrocarbons and halogens are as described above. As a preferable hydrocarbon in General Formula (2), givable are an alkyl group of which the number of carbon atoms is from one to six, a vinyl group, and a phenyl group.

Since the halogen-containing polymer of which the halogen mass percentage is much is believed to be preferable as described above, each of the "$R^2$," "$R^3$" and "$R^4$" in General Formula (2) is preferred to be hydrogen or halogen independently.

As for an especially suitable halogen-containing polymer, giving the following is possible: polyvinylidene fluoride, polyvinyl fluoride, polyvinylidene chloride, and polyvinyl chloride.

Preferable employment amounts of the $CaSi_2$ and halogen-containing polymer are set so that the halogen-containing polymer is employed in such an amount as a molar ratio of the halogen makes two or more with respect to an amount of Ca in the $CaSi_2$ to be employed.

The $CaSi_2$ and halogen-containing polymer are also allowed to be put in a state where the $CaSi_2$ and halogen-containing polymer contact one another, or are even permitted to be put under a noncontact condition. In order to put the $CaSi_2$ and halogen-containing polymer in a state of contacting one another, mixing the $CaSi_2$ and halogen-containing polymer is allowed.

A heating temperature in the production process according to the present invention is a temperature being a carbonization temperature or more of the halogen-containing polymer. Note herein that an organic compound starts carbonizing at around 400° C. Thus, the higher the heating temperature is, the more highly electrically-conductive carbides are obtainable. Hence, as for the heating temperature according to the present production process, the heating temperature falls preferably within a range of from 400 to 1,500° C., more preferably within a range of from 500 to 1,300° C., or much more preferably within a range of from 600 to 1,200° C. The heating temperature makes also possible adjusting proportions of amorphous silicon and silicon crystallites included in a carbon-coated silicon material to be produced, and makes also possible adjusting sizes of the silicon crystallites. In addition, the heating temperature makes possible even adjusting configurations and sizes of nanometer-level-thickness layers including the amorphous silicon and silicon crystallites which are included in the carbon-coated silicon material to be produced.

A size of the aforementioned silicon crystallites falls preferably within a range of from 0.5 nm to 300 nm, more preferably within a range of from 1 nm to 100 nm, much more preferably within a range of from 1 nm to 50 nm, or especially preferably within a range of from 1 nm to 10 nm. Note that the size of the silicon crystallites is computed by the Scherrer equation using the half-value width of a diffraction peak of Si (111) plane in an XRD chart which is obtained by carrying out an X-ray diffraction measurement (or XRD measurement) to the carbon-coated silicon material.

The production process according to the present invention makes obtainable a carbon-coated silicon material comprising a structure in which plate-shaped silicon bodies are laminated in a plurality of pieces in the thickness direction. The structure is ascertainable by observation with a scanning-type electron microscope, and the like. When employing the carbon-coated silicon material according to the present invention as an active material for lithium-ion secondary battery is taken into consideration, the plate-shaped silicon bodies preferably have a thickness falling within a range of from 10 nm to 100 nm, or more preferably have a thickness falling within a range of from 20 nm to 50 nm, in order for efficient insertion and elimination (or sorption and desorption) reactions of the lithium ions. Moreover, the plate-shaped silicon bodies preferably have a major-axis-direction length falling within a range of from 0.1 µm to 50 µm. In addition, the plate-shaped silicon bodies preferably exhibit a ratio, (Major-axis-direction Length)/(Thickness), falling within a range of from two to 1,000.

Moreover, in the production process according to the present invention, a heating condition is also set allowably to be a multistage heating condition including such two or more stages as a step of heating the halogen-containing polymer and $CaSi_2$ at a temperature being a decomposition temperature or more of the halogen-containing polymer; and a step of heating the halogen-containing polymer and $CaSi_2$ at a temperature being a carbonization temperature or more of post-decomposition polymers. Note herein that the "decomposition temperature of the halogen-containing polymer" is a temperature at which a hydrohalic acid or halogen molecules break away from the halogen-containing polymer.

In addition, in the production process according to the present invention, a heating condition is even set permissibly to be a multistage heating condition including such three or more stages as a step of heating the halogen-containing polymer and $CaSi_2$ at a temperature being a melting point or glass transition temperature or more of the halogen-containing polymer; a step of heating the halogen-containing polymer and $CaSi_2$ at a temperature being a decomposition temperature or more of the halogen-containing polymer; and a step of heating the halogen-containing polymer and $CaSi_2$ at a temperature being a carbonization temperature or more of post-decomposition polymers.

The heating condition is explained hereinafter while taking polyvinyl chloride as an example. The melting point of polyvinyl chloride falls within a range of from 85 to 210° C. roughly, and the decomposition temperature of polyvinyl chloride, namely, a hydrogen-chloride generation temperature falls within a range of from 210 to 300° C. roughly. If so, when polyvinyl chloride is adopted as the halogen-containing polymer in the production process according to the present invention, a heating condition is set also allowably to be a three-stage heating condition including a first heating step of heating the polyvinyl chloride and $CaSi_2$ at around 200° C.; a second heating step of heating the polyvinyl chloride and $CaSi_2$ at around 300° C.; and a third heating step of heating the polyvinyl chloride and $CaSi_2$ at around 900° C. Undergoing the first heating step is presumed to enable the $CaSi_2$ to more uniformly disperse within a matrix of the polyvinyl chloride. Next, undergoing the second heating step is presumed to heighten a conversion ratio of $CaSi_2$ into $Si_6H_6$ and another conversion ratio of $CaSi_2$ into Si, because the $CaSi_2$, which is put in a suitable dispersion state, is capable of reacting with HCl efficiently. Moreover, undergoing the third heating step eventually is presumed not only to upgrade a final conversion ratio of from the $CaSi_2$ to Si but also to increase an amount of silicon crystals within a silicon material; and is presumed accordingly to obtain a carbon-coated silicon material of which the carbon coating is done more uniformly to the silicon material.

The production process according to the present invention is carried out preferably in an atmosphere of inert gas, such as an argon, helium or nitrogen gas.

As for a production apparatus used specifically in the production process according to the present invention, exemplifiable is such a heating furnace as a high-frequency induction heating furnace, an electric furnace, an arc furnace, or a gas furnace. Demarcating the heating furnace into a plurality of chambers is also allowed. The $CaSi_2$ and halogen-containing polymer are also arranged allowably within the heating furnace directly, or the $CaSi_2$ and/or the halogen-containing polymer, which have been arranged within an identical container or distinct containers, are even arranged permissibly within the heating furnace together with the container or containers.

As for the container, an allowable container is made of a high-melting-point metal, such as molybdenum, tungsten, tantalum or niobium. Alternatively, a permissible container is made of ceramic, such as alumina, zirconia, silicon nitride, aluminum nitride, silicon carbide, cordierite, mullite, steatite, calcia, magnesia, sialon, quartz, VYCOR (registered trademark) or sapphire glass.

Making the container sealable hermetically is also allowed, or even providing the container with a ventilation unit is permitted. Moreover, furnishing the container with a valve opening and closing in compliance with an internal pressure is also allowed. As the container, even using a lidded crucible, and the like, is permitted.

The following have been described above: the $CaSi_2$ and halogen-containing polymer are also put allowably in a state of contacting one another; or the $CaSi_2$ and halogen-containing polymer are even put permissibly under a noncontact condition. Note herein that, in order to put the $CaSi_2$ and halogen-containing polymer in a state of contacting one another, a mixture in which the $CaSi_2$ and halogen-containing polymer are mixed is supplied allowably to the production apparatus. Alternatively, the $CaSi_2$ and halogen-containing polymer are also supplied permissibly to the heating furnace having a mixing function. In order to put the $CaSi_2$ and halogen-containing polymer under a noncontact condition, the two are arranged allowably within the heating furnace while simply separating the two from one another. To be concrete, the chambers demarcated within the heating furnace are utilized permissibly to put the two in a non-contacting state; or at least a container is utilized permissibly to put the two in a non-contact state at the inside and outside, respectively.

Putting the $CaSi_2$ and halogen-containing polymer under a noncontact condition results in producing such advantageous effects as upgrading the readiness of reaction control, inhibiting heat from generating locally, and the controlled grain-size distribution in the carbon-coated silicon material.

Note that, in the conventional production processes set forth in Patent Application Publication No. 2 and Patent Application Publication No. 3, the generation of silane gas (i.e., $SiH_4$ (g)), a by-product, was observed during the course of producing the silicon materials. Consequently, in the conventional production processes, a facility, such as a silane-gas removal apparatus, is assumed to be needed.

However, the present inventors discovered that the production process according to the present invention inhibits the silane gas from generating. Even in terms of inhibiting the generation of silane gas, saying is possible that the production process according to the present invention is useful.

The carbon-coated silicon material obtained by the production process according to the present invention is also allowed to turn into particles with a certain grain size distribution by undergoing pulverizing and classifying operations. As for a preferable grain size distribution for the carbon-coated silicon material, exemplifiable are grain size distributions of which the average particle diameter "$D_{50}$" falls within a range of from one to 30 μm when measured by a common laser-diffraction type grain-size-distribution measuring apparatus. Note that more preferably exemplifiable are grain size distributions of which the average particle diameter "$D_{50}$" falls within a range of from one to 10 μm.

The carbon-coated silicon material obtained by the production process according to the present invention is supplied preferably to a step of washing the carbon-coated silicon material with a solvent of which the relative permittivity is 5 or more. The washing step is a step of removing unnecessary components, which adhere onto the carbon-coated silicon material, by washing the material with a solvent (hereinafter, referred to sometimes as a "washing solvent") of which the relative permittivity is 5 or more. The step is aimed mainly at removing salts which are capable of dissolving into the washing solvent, such as calcium halide. For example, when polyvinyl chloride is used as the halogen-containing polymer, $CaCl_2$ is presumed to reside or be left over in the carbon-coated silicon material. Hence, washing the carbon-coated silicon material with the washing solvent leads to dissolving unnecessary components including $CaCl_2$ into the washing solvent to make the unnecessary components removable. The washing step is also allowed to be done by a method of immersing the carbon-coated silicon material into the washing solvent, or is even permitted to be done by another method of pouring the washing solvent onto the carbon-coated silicon material.

As for the washing solvent, a washing solvent of which the relative permittivity is higher is a preferable option, from a viewpoint of whether salts are likely to dissolve into the washing solvent. A washing solvent of which the relative permittivity is 10 or more, or even 15 or more, is presentable as a more preferable option. As for a range of the relative permittivity of the washing solvent, the relative permittivity falls preferably within a range of from 5 to 90, more preferably within a range of from 10 to 90, or much more preferably within a range of from 15 to 90. Moreover, as the washing solvent, using an independent solvent is also allowed, or even using a mixed solvent comprising a plurality of solvents is permitted.

As for specific examples of the washing solvent, the following are givable: water, methanol, ethanol, n-propanol, i-propanol, n-butanol, i-butanol, sec-butanol, tert-butanol, ethylene glycol, glycerin, N-methyl-2-pyrrolidone, N,N-dimethylformamide, N,N-dimethylacetamide, dimethyl sulfoxide, acetonitrile, ethylene carbonate, propylene carbonate, benzyl alcohol, phenol, pyridine, tetrahydrofuran, acetone, ethyl acetate, and dichloromethane. Adopting as the washing solvent a fluorine-substituted solvent, in which fluorine atoms have substituted for some or all of hydrogen atoms in the chemical structure of the specific solvents is also allowed. As for the water serving as the washing solvent, any of distilled water, water permeated through a reverse osmosis membrane and deionized water is preferable.

For reference, Table 1 shows the relative permittivities of various kinds of solvents.

TABLE 1

| Solvent | Relative Permittivity |
|---|---|
| Water | 80 |
| Methanol | 33 |
| Ethanol | 24 |
| n-Propanol | 20 |
| i-Propanol | 18 |
| n-Butanol | 18 |
| Ethylene Glycol | 39 |
| Glycerin | 43 |
| N-methyl-2-pyrrolidone | 32 |
| N,N-dimethylformamide | 38 |
| Dimethyl Sulfoxide | 47 |
| Acetonitrile | 37 |
| Ethylene Carbonate | 90 |
| Propylene Carbonate | 64 |
| Benzyl Alcohol | 13 |
| Phenol | 9.8 |
| Pyridine | 12 |
| Acetone | 21 |
| Dichloromethane | 9 |
| Tetrahydrofuran | 7.5 |
| Ethyl Acetate | 6 |
| The following are solvents of which the relative permittivity is less than 5. | |
| Dimethyl Carbonate | 3 |
| Diethyl Carbonate | 3 |
| Ethyl Methyl Carbonate | 3 |
| Benzene | 2 |
| Cyclohexane | 2 |
| Diethyl Ether | 4 |

As for the washing solvent, the following are preferable especially: water, methanol, ethanol, n-propanol, i-propanol, n-butanol, i-butanol, sec-butanol, tert-butanol, and acetone.

When using a mixed solvent comprising a plurality of solvents (e.g., water and another solvent) serving as the washing solvent, adopting the other solvent is allowed preferably in a proportion of from one to 100 parts by volume, more preferably from two to 50 parts by volume, or much more preferably from five to 30 parts by volume, to 100 parts by volume of the water. Using such a mixed solvent as the washing solvent leads to such a case as the dispersibility or affinity of the carbon-coated silicon material to the washing solvent upgrades. As a result, the unnecessary components elute out suitably into the washing solvent.

After the washing step, the carbon-coated silicon material is filtered and dried preferably to remove the washing solvent from the carbon-coated silicon material.

Repeating the washing step a plurality of rounds is also allowed. In doing so, even altering the washing solvent is permitted. For example, as the washing solvent for a first-round washing step, water of which the relative permittivity is high remarkably is selected, and then, as the washing solvent for a second-round washing step, ethanol or acetone, which is compatible with the water and which has a low boiling point, is used. Thus, not only the water is made removable efficiently, but also the washing solvents are made preventable readily from residing or being left over.

A post-washing-step drying step is carried out preferably in a depressurized environment, and is carried out more preferably at a temperature being a boiling point or more of the washing solvent. As for the temperature, being from 80° C. to 110° C. is preferable.

As described above, the carbon-coated silicon material according to the present invention is producible via the production process according to the present invention. Note herein that also allowed is to carry out an additional carbon coating step of further coating carbon onto the present carbon-coated silicon material obtained by the present production process. Moreover, even permitted is, before the additional carbon coating step, to carry out a carbon removal step of removing at least some of carbon on the present carbon-coated silicon material.

As for the additional carbon coating step, applying a conventional publicly-known technique thereto is allowed. For example, permitted is to apply thereto a so-called thermal CVD method in which an organic-substance gas is carbonized by contacting a material with the organic-substance gas and then heating the material in a nonoxidizing atmosphere.

As for the organic-substance gas, using the gas of a vaporized organic substance, the gas of a sublimed organic substance, or the vapor of an organic substance is possible. Moreover, as for the organic substance generating the organic-substance gas, usable is an organic substance capable of thermally decomposing and then carbonizing by being heated in a nonoxidizing atmosphere. For example, givable is at least one member or a mixture selected from the group consisting of the following, and the like: saturated aliphatic hydrocarbons, such as methane, ethane, propane, butane, isobutane, pentane and hexane; unsaturated aliphatic hydrocarbons, such as ethylene, propylene and acetylene; alcohols, such as methanol, ethanol, propanol and butanol; aromatic hydrocarbons, such as benzene, toluene, xylene, styrene, ethylbenzen, diphenylmethane, naphthalene, phenol, cresol, benzoic acid, salicylic acid, nitrobenzene, chlorobenzene, indene, cumarone, pyridine, anthracene and phenathrene; esters, such as ethyl acetate, butyl acetate and amyl acetate; and fatty acids. As for the organic substance, a saturated aliphatic hydrocarbon, such as propane, is preferable.

Although a treatment temperature at the additional coating step differs depending on kinds of the organic substance, allowable is setting the treatment temperature at a temperature which is higher by 50° C. or more than a temperature at which the organic substance decomposes thermally. However, when the temperature is too high, or when a concentration of the organic-substance gas is too high, since so-called soot generates, permissible is selecting a condition under which no soot generates. Setting up an organic-substance amount and treatment time appropriately makes a thickness of the carbon layer to be formed controllable.

The additional carbon coating step is carried out desirably after putting the material in a fluidized state. The additional carbon coating step thus done enables the entire surface of the material to contact with the organic-substance gas, and makes possible forming a uniform carbon layer. Although various methods, such as using a fluidized bed, are available for putting the material in a fluidized state, having the material contact with the organic-substance gas while stirring the material is preferable. For example, using a rotating furnace having a baffle plate in the interior enables a carbon layer being uniform as a whole to form, because the material residing on the baffle plate falls down from a predetermined height as the rotating furnace rotates so that the material is stirred to contact with the organic-substance gas and then a carbon layer is formed under the circumstances.

The carbon-coated silicon material according to the present invention, which has been obtained by carrying out the additional carbon coating step, is put in a state where the carbon coating is done by two types of the methods. The thus made present carbon-coated silicon material is put in a state where a coating state made insufficiently by one type of the carbon-coating method has been complemented by another carbon-coating method. Consequently, a secondary battery furnished with such a present carbon-coated silicon material serving as a negative-electrode active material is believed to exhibit optimized battery characteristics.

As for the carbon removal step, allowable is heating the carbon-coated silicon material in the presence of oxygen to turn carbon into carbon dioxide or carbon monoxide in order to remove the carbon. At the carbon removal step, some of or all of carbon in the carbon-coated silicon material is removable. As for a heating temperature thereat, exemplifiable is being from 350 to 650° C.

At the carbon removal step, expecting is possible that impurities included in the carbon-coated silicon material according to the present invention are removed simultaneously. Consequently, the present carbon-coated silicon material, which is produced while being supplied to the additional carbon coating step via the carbon removal step, is inferred to be a more suitable material.

In the carbon-coated silicon material according to the present invention, carbon and silicon make the indispensable or essential constituent elements. When the present carbon-coated silicon material is taken as 100% by mass, carbon is included preferably in an amount falling within a range of from one to 30% by mass; more preferably in an amount falling within a range of from three to 20% by mass; or much more preferably in an amount falling within a range of from five to 15% by mass. Moreover, when the present carbon-coated silicon material is taken as 100% by mass, silicon is included preferably in an amount falling within a range of from 50 to 99% by mass; more preferably in an amount falling within a range of from 60 to 97% by mass; or much more preferably in an amount falling within a range of from 65 to 95% by mass.

In the carbon-coated silicon material according to the present invention, such cases arise as inevitable impurities or impurities derived from the raw materials, such as Ca and halogen, are included. The following ranges are exemplifiable as a percentage-by-mass presence amount of such impurities:

Ca: from zero to 5% by mass, zero to 3% by mass, 0 to 2% by mass, 0.1 to 3% by mass, or 0.5 to 2% by mass; and halogen: from zero to 10% by mass, or from 0.001 to 6% by mass.

The carbon-coated silicon material according to the present invention preferably has voids internally. When the present carbon-coated silicon material is used as an active material for lithium-ion secondary battery, the voids are presumed to play a role of buffering the expansions and contractions of the present carbon-coated silicon material upon the occurrence of the insertion and elimination (or sorption and desorption) reactions of lithium ions.

A carbon-coated silicon material obtainable by the production process according to the present invention is employable as a negative-electrode active material for secondary battery, such as lithium-ion secondary batteries.

Hereinafter, explanations are made on a secondary battery according the present invention while exemplifying a lithium-ion secondary battery as one of representatives for the secondary battery. A lithium-ion secondary battery according to the present invention comprises the carbon-coated silicon material as a negative-electrode active material. To be concrete, the present lithium-ion secondary battery comprises a positive electrode, a negative electrode including the carbon-coated silicon material as a negative-electrode active material, an electrolytic solution, and a separator.

The positive electrode comprises a current collector, and a positive-electrode active-material layer bound together onto a surface of the current collector.

A "current collector" refers to a chemically inactive high electron conductor for keeping an electric current flowing to electrodes during the discharging or charging operations of a lithium-ion secondary battery. As for the current collector, the following are exemplifiable: at least one member selected from the group consisting of silver, copper, gold, aluminum, tungsten, cobalt, zinc, nickel, iron, platinum, tin, indium, titanium, ruthenium, tantalum, chromium, and molybdenum; as well as metallic materials, such as stainless steels. Covering the current collector with a publicly-known protective layer is also allowed. Even using as the current collector one of the optional current collectors of which the surface is treated by a publicly-known method is permitted.

The current collector is enabled to have such a form as a foil, a sheet, a film, a linear shape, a rod-like shape, or a mesh. Consequently, as the current collector, a metallic foil, such as a copper foil, a nickel foil, an aluminum foil or a stainless-steel foil, is usable suitably, for instance. When the current collector has a foiled, sheeted or filmed form, a preferable thickness thereof falls within a range of from 1 µm to 100 µm.

The positive-electrode active-material layer includes a positive-electrode active material, as well as a conductive additive and/or a binding agent, if needed.

As for the positive-electrode active material, the following are givable: one of lamellar compounds such as $Li_aNi_bCo_cMn_dD_eO_f$ (where $0.2 \leq$ "a" $\leq 2$, "b"+"c"+"d"+"e"=1, $0 \leq$ "e" $< 1$, "D" is at least one element selected from the group consisting of Li, Fe, Cr, Cu, Zn, Ca, Mg, S, Si, Na, K, Al, Zr, Ti, P, Ga, Ge, V, Mo, Nb, W and La, and $1.7 \leq$ "f" $\leq 3$); and $Li_2MnO_3$. Moreover, as the positive-electrode active material, the following are further givable: spinel, such as $LiMn_2O_4$; a solid solution constituted of a mixture of spinel and a lamellar compound; and a polyanion-based compound expressed by $LiMPO_4$, $LiMVO_4$ or $Li_2MSiO_4$ (where "M" in the formula is at least one member selected from the group consisting of Co, Ni, Mn and Fe). In addition, as the positive-electrode active material, the following are furthermore givable: tavorite-based compounds expressed by $LiMPO_4F$ (where "M" is a transition metal), such as $LiFePO_4F$; and borate-based compounds expressed by $LiMBO_3$ (where "M" is a transition metal), such as $LiFeBO_3$. Any of the metallic oxides used as the positive-electrode active material is allowed to have a basic composition in accordance with the above-mentioned compositional formulas, and substituted metallic oxides in which another metallic element substitutes for the metallic element included in the basic composition are also employable as the positive-electrode active material. Moreover, as the positive-electrode active material, using is also possible a positive-electrode active material which does not include any lithium ion contributing to charging and discharging. For example, even using the following is possible: elemental sulfur (S); compounds in which sulfur and carbon are composited; metallic sulfides, such as $TiS_2$; oxides, such as $V_2O_5$ and $MnO_2$; polyaniline and anthraquinone, as well as compounds including one of the aromatic compounds in the chemical structure; conjugate system materials, such as conjugated-diacetic acid system organic substances; and the other publicly-known materials. In addition, compounds having a stable radical, such as nitroxide, nitronyl nitroxide, galvinoxyl or phenoxyl radical, are also adopted allowably as the positive-electrode active material. When using a positive-electrode active material free of lithium, adding lithium ions in advance to the positive electrode and/or the negative electrode by a publicly-known method is needed. Note herein that, in order to add lithium ions, using metallic lithium or a compound including the lithium ions is permitted.

The conductive additive is added in order to enhance the electrically-conducting property of an electrode. Consequently, optionally adding the conductive additive is allowed when an electrode lacks the electrically-conducting property, so even not adding the conductive additive is permitted when an electrode is sufficiently good in the electrically-conducting property. As for the conductive additive, a chemically inactive high electron conductor is allowed, and accordingly the following are exemplified: carbonaceous fine particles, such as carbon black, graphite, acetylene black and KETJENBLACK (registered trademark); gas-phase-method carbon fibers (or vapor-grown carbon fibers (or VGCF)); and various metallic particles. One of the conductive additives is addable independently, or two or more thereof are combinable to add to the active-material layer.

A compounding proportion of the conductive additive within the active-material layer falls preferably in such a mass ratio as (Active Material):(Conductive Additive)=from 1:0.005 to 1:0.5; more preferably from 1:0.01 to 1:0.2; or much more preferably from 1:0.03 to 1:0.1. The compounding proportion is thus set because no electrically-conducting paths with good efficiency are formable when the conductive additive is too less; moreover, because not only the active-material layer worsens in the formability but also an electrode lowers in the energy density when the conductive additive is too much.

The binding agent is a constituent element which fastens the active material and conductive additive together onto a surface of the current collector to perform a role of maintaining the electrically-conducting networks within an electrode. As for the binding agent, the following are exemplifiable: fluorine-containing resins, such as polyvinylidene fluoride, polytetrafluoroethylene and fluorinated rubber; thermoplastic resins, such as polypropylene and polyethylene; imide-based resins, such as polyimide and polyamide-imide; alkoxysilyl group-containing resins; acrylic resins, such as poly(meth)acrylate; styrene-butadiene rubber (or SBR); and carboxymethyl cellulose. Adopting one of the binding agents independently, or adopting a plurality of the binding agents, is allowed.

A compounding proportion of the binding agent within the active-material layer falls preferably in such a mass ratio as (Active Material):(Binding Agent)=from 1:0.001 to 1:0.3; more preferably from 1:0.005 to 1:0.2; or much more preferably from 1:0.01 to 1:0.15. The compounding proportion is thus set because the formability of an electrode declines when the binding agent is too less; moreover, because the energy density of an electrode lowers when the binding agent is too much.

The negative electrode comprises a current collector, and a negative-electrode active-material layer bound together onto a surface of the current collector. As to the current collector, appropriately or adequately adopting one of the current collectors explained for the positive electrode is allowed. The negative-electrode active-material layer includes a negative-electrode active material, as well as a conductive additive and/or a binding agent, if needed.

As for the negative-electrode active material, a negative-electrode active material comprising the carbon-coated silicon material according to the present invention is allowed. Adopting the present carbon-coated silicon material alone is also allowed, or even combining the present carbon-coated silicon material with a publicly-known negative-electrode active material to use is permitted.

As to the conductive additive and binding agent to be used in the negative electrode, the conductive additive and binding agent explained for the positive electrode are adopted allowably in the same compounding proportions as described above appropriately or suitably.

As for a method of forming the active-material layer onto a surface of the current collector, the active material is allowed to be coated onto a surface of the current collector using a heretofore publicly-known method, such as a roll-coating method, a die-coating method, a dip-coating method, a doctor-blade method, a spray-coating method or a curtain-coating method. To be concrete, an active material, and a solvent, as well as a binding agent and/or a conductive additive, if needed, are mixed to prepare a slurry. As for the aforementioned solvent, the following are exemplifiable: N-methyl-2-pyrolidone, methanol, methyl isobutyl ketone, and water. After the slurry is coated onto a surface of the current collector, the slurry is dried thereon. For the purpose of enhancing the density of an electrode, even compressing the post-drying composition is permitted.

The electrolytic solution includes a nonaqueous solvent, and an electrolyte dissolved in the nonaqueous solvent.

As for the nonaqueous solvent, cyclic esters, linear or chain-shaped esters, ethers, and the like, are employable. As for the cyclic esters, the following are exemplifiable: ethylene carbonate, propylene carbonate, butylene carbonate, fluorinated ethylene carbonate, gamma-butyrolactone, vinylene carbonate, 2-methyl-gamma-butyrolactone, acetyl-gamma-butyrolactone, and gamma-valerolactone. As for the linear esters, the following are exemplifiable: dimethyl carbonate, diethyl carbonate, dibutyl carbonate, dipropyl carbonate, ethyl methyl carbonate, alkyl propionate ester, dialkyl malonate ester, alkyl acetate ester, and so forth. As for the ethers, the following are exemplifiable: tetrahydrofuran, 2-methyltetrahydrofuran, 1,4-dioxane,1,2-dimethoxyethane, 1,2-diethoxyethane, and 1,2-dibutoxyethane. As for the nonaqueous solvent, adopting a compound, in which fluorine atoms have substituted for some or all of hydrogen atoms in the chemical structure of the aforementioned specific solvents, is also allowed.

As for the electrolyte, a lithium salt, such as $LiClO_4$, $LiAsF_6$, $LiPF_6$, $LiBF_4$, $LiCF_3SO_3$ or $LiN(CF_3SO_2)_2$, is exemplifiable.

As for the electrolytic solution, the following solution is exemplifiable: a solution comprising a lithium salt, such as $LiClO_4$, $LiPF_6$, $LiBF_4$ or $LiCF_3SO_3$, dissolved in a concentration of from 0.5 mol/L to 1.7 mol/L approximately in a nonaqueous solvent, such as ethylene carbonate, dimethyl carbonate, propylene carbonate or diethyl carbonate.

The separator is a constituent element which isolates the positive electrode and negative electrode from one another, but which lets lithium ions pass therethrough while preventing the two electrodes from contacting with one another to result in short-circuiting. As for the separator, the following are givable: synthetic resins, such as polytetrafluoroethylene, polypropylene, polyethylene, polyimide, polyamide, polyaramid (or aromatic polyamide), polyester, and polyacrylonitrile; polysaccharides, such as cellulose, and amylose; natural polymers, such as fibroin, keratin, lignin, and suberin; porous bodies using one member or plural members of electrical insulating materials, such as ceramics; nonwoven fabrics; or woven fabrics, and the like. Moreover, turning the separator into a multi-layered structure is also allowed.

Next, explanations are made on a process for manufacturing the lithium-ion secondary battery.

The positive electrode and negative electrode turned into a polar-plate subassembly, setting or inserting the separator between the positive electrode and the negative electrode, if needed. Making the polar-plate subassembly into any of the following types is allowed: a laminated type in which the positive electrode, the separator and the negative electrode are superimposed; or a rolled-around type in which the positive electrode, the separator and the negative electrode are rolled around. After connecting intervals from the positive-electrode current collectors and negative-electrode current collectors up to the positive-electrode terminals and negative-electrode terminals, which lead to the outside, with leads, and the like, for collecting electricity, providing the polar-plate subassembly with the electrolytic solution to complete a lithium-ion secondary battery is permitted. Moreover, the lithium-ion secondary battery according to the present invention is allowed to undergo charging and discharging operations which are practiced in a voltage range suitable for the types of active materials included in the electrodes.

A configuration of the lithium-ion secondary battery according to the present invention is not at all limited especially, and accordingly adoptable are various configurations, such as cylindered types, cornered types, coined types and laminated types.

Mounting the lithium-ion secondary battery according to the present invention in a vehicle is allowed. The vehicle is permitted to be a vehicle making use of electric energies produced by the present lithium-ion secondary battery for all or some of the power source, and is allowed to be electric vehicles or hybrid vehicles, and the like, for instance. When mounting the present lithium-ion secondary battery in the vehicle, connecting a plurality of the present lithium-ion secondary batteries in series is permitted to make an assembled battery. Other than the vehicle, as for instruments in which the present lithium-ion secondary battery is mounted, the following are givable: personal computers, portable communication gadgets, various home electric appliances driven by batteries, office devices, or industrial instruments, and so forth. Moreover, using the present lithium-ion secondary battery is allowed for the following: electric storage apparatuses and power smoothing apparatuses for wind-force power generation, photovoltaic power generation, hydraulic power generation, and other electric power systems; powers for vessel, or the like, and/or electric-power supply sources for auxiliary machine therefor; powers for aircraft, spacecraft, or the like, and/or electric-power supply sources for auxiliary machine therefor; supplementary power sources for vehicle in which electricity is not used for the power source; power sources for mobile household robot; power sources for system backup; power sources for uninterruptible power-supply apparatus; and electric storage apparatuses for temporarily storing electric power which is required for charging in charging stations, etc., for electric-powered vehicle.

Having been explained so far are the embodiment modes of the present invention. However, the present invention is not limited to the aforementioned embodying modes at all. The present invention is feasible in various modes, to which changes or modifications that one of ordinary skill in the art carries out are made, within a range not departing from the gist of the present invention.

EXAMPLES

Hereinafter, examples and comparative examples are shown to describe the present invention more concretely. Note that the examples in the following descriptions do not limit the present invention at all. In the following descriptions, the term, "part," means a part by mass, and the term, "%," means a percentage by mass, unless otherwise specified especially.

First Example

A carbon-coated silicon material and lithium-ion secondary battery according to a first example were made as described below.

1-g $CaSi_2$ and 1.3-g polyvinyl chloride of which the polymerization degree was 1,100 were mixed to make a mixture. The molar ratio between Ca and Cl was 1:2 in the mixture. The mixture was put in a crucible made of alumina in an argon atmosphere. Then, the crucible was covered with a lid, and was then arranged within an electric furnace. After setting up a temperature of the electric furnace at 200° C., the mixture was heated at 200° C. for 1 hour. Subsequently, after setting up the temperature of the electric furnace at 300° C., the mixture was heated at 300° C. for 1 hour. Moreover, after setting up the temperature of the electric furnace at 900° C., the mixture was heated at 900° C. for 1 hour to turn the mixture into a calcined body.

Note that the generation of gas was observed at the time of reaction. The gas included black smoke seemed to be soot. When the gas occurring at the time of reaction was analyzed by an infrared spectrophotometer, the generation of silane gas was not observed.

After washing the obtained calcined body with water, the calcined body was further washed with acetone. Subsequently, the calcined body was subjected to reduced-pressure drying to obtain a black-colored carbon-coated silicon material according to the first example.

A slurry was prepared by mixing the following each other: the carbon-coated silicon material according to the first example serving as a negative-electrode active material in an amount of 45 parts by mass; natural graphite serving as another negative-electrode active material in an amount of 40 parts by mass; acetylene black serving as a conductive additive in an amount of 5 parts by mass; polyamide-imide serving as a binder in an amount of 10 parts by mass; and N-methyl-2-pyrolidone serving as a solvent. The slurry was coated onto a surface of an electrolyzed copper foil (serving as a current collector) of which the thickness was about 20 μm using a doctor blade, and was then dried to form a negative-electrode active-material layer on the copper foil. Thereafter, the current collector and the negative-electrode active-material layer were adhesion joined firmly by a roll pressing machine. The adhesion-joined substance was vacuum dried at 200° C. for 2 hours to form a negative electrode of which the negative-electrode active-material layer had a thickness of 20 μm.

Using as an evaluation electrode the negative electrode fabricated through the procedures mentioned above, a lithium-ion secondary battery (i.e., a half cell) was fabricated. A metallic lithium foil with 500 μm in thickness was set as the counter electrode.

The counter electrode was cut out to ϕ13 mm, and the evaluation electrode was cut out to ϕ11 mm. Then, a separator composed of a glass filter produced by HOECHST CELANESE Corporation and "Celgard 2400" produced by CELGARD Corporation was set or held between the two to make an electrode assembly. The electrode assembly was accommodated in a battery case (e.g., a member for CR2032-type coin battery, a product of HOSEN Co., Ltd.). A nonaqueous electrolytic solution was injected into the battery case. Note that the nonaqueous electrolytic solution comprised a mixed solvent composed of ethylene carbonate and diethyl carbonate mixed one another in a ratio of 1:1 by volume, and $LiPF_6$ dissolved in the mixed solvent in a concentration of 1 M. Then, the battery case was sealed hermetically to obtain a lithium-ion secondary battery according to the first example.

First Comparative Example

A mixed solution of 7-mL HF aqueous solution with 46%-by-mass concentration and 56-mL HCl aqueous solution with 36%-by-mass concentration was held at 0° C. in an ice bath. In an argon-gas atmosphere, the mixed solution was stirred after adding 3.3-g $CaSi_2$ to the mixed solution. A reaction liquid therein was subjected to a temperature increase up to room temperature after confirming the completion of bubbling from the reaction liquid, and was further stirred at room temperature for another two hours. Thereafter, the reaction liquid was furthermore stirred for extra 10 minutes after adding 20-mL distilled water to the reaction liquid. On the occasion, a yellow-colored powder floated.

The obtained reaction liquid was filtered. The residual was washed with 10-mL ethanol after washing the residual with 10-mL distilled water, and was then vacuum dried to obtain 2.5-g lamellar silicon compound.

The aforementioned lamellar silicon compound was weighed out in an amount of one gram. Then, the lamellar silicon compound was subjected to a heat treatment, which was carried out while retaining the lamellar silicon compound at 500° C. for one hour in an argon-gas atmosphere of which the $O_2$ volume was 1% by volume or less, to obtain a silicon material.

Except that the aforementioned silicon material was used as a negative-electrode active material in an amount of 45 parts by mass and natural graphite was used as another negative-electrode active material in an amount of 40 parts by mass, a lithium-ion secondary battery according to a first comparative example was obtained in the same manner as the first example.

First Evaluative Example

The carbon-coated silicon material according to the first example was subjected to the following tests.

Figure 2A:
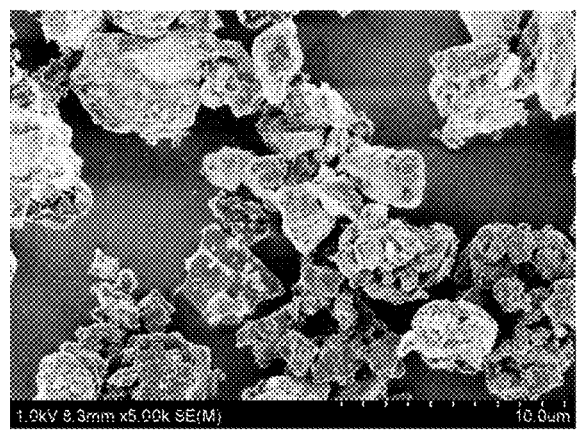
FIG. 2A is an SEM image of a carbon-coated silicon material according to a first example.
Figure 2B:
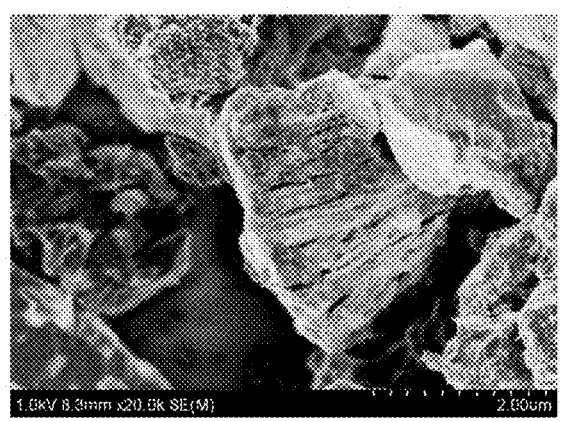
FIG. 2B is another SEM image of the carbon-coated silicon material according to the first example.
Figure 2C:
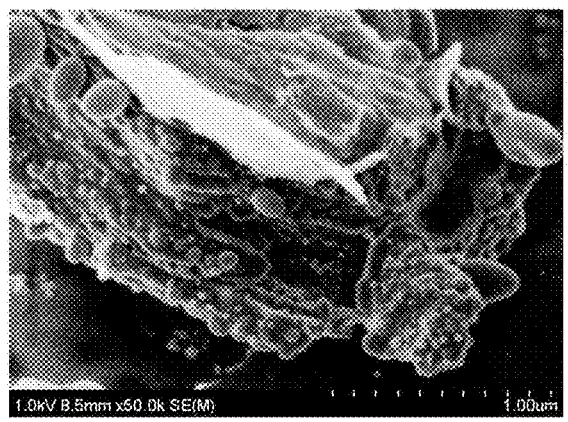
FIG. 2C is still another SEM image of the carbon-coated silicon material according to the first example.

The carbon-coated silicon material according to the first example was observed by a scanning-type electron microscope (or SEM). FIG. 2A, FIG. 2B and FIG. 2C show the obtained SEM images. The lower-right scale in FIG. 2A has an overall length of 10 μm; the lower-right scale in FIG. 2B has an overall length of two μm; and the lower-right scale in FIG. 2C has an overall length of one μm. From FIG. 2A through FIG. 2C, particles were observed to comprise the silicon material covered with carbon. From FIG. 2B, such an appearance was observed as the carbon coating was done thinly onto the lamellar silicon material.

Figure 3:
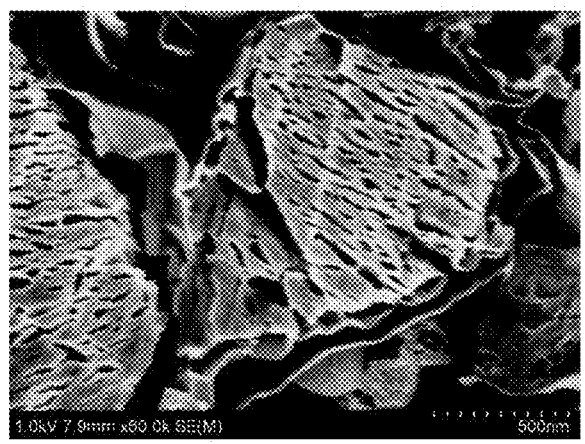
FIG. 3 is an SEM image of a cross section in the carbon-coated silicon material according to the first example.

A cross section of the carbon-coated silicon material according to the first example was formed by an ion milling method using argon ion. The cross section was observed with an SEM. FIG. 3 shows an obtained SEM image. From FIG. 3, such a state is observable as multiple pieces of plate-shaped silicon bodies laminated in the thickness-wise direction are coated by carbon. Moreover, voids were found out to exist inside the carbon-coated silicon material according to the first example.

The carbon-coated silicon material according to the first example was subjected to a compositional analysis which was carried out by a fluorescent X-ray analyzer, an oxygen/nitrogen analyzer (e.g., "EMGA" produced by HORIBA, Ltd.), and a carbon/sulfur analyzer (e.g., "EMIA" produced by HORIBA, Ltd.). Table 2 shows the results. Note that the numerical values in Table 2 are mass percentages.

TABLE 2

| O | C | Si | Ca | Fe | Al | Cl |
|---|---|---|---|---|---|---|
| 4.8 | 10.6 | 72.3 | 3.3 | 2.2 | 0.8 | 5.9 |

The Fe and Al are impurities derived from the raw materials. The O is believed to be derived from the raw materials, or the washing by water or the washing by acetone. Although the Ca and Cl resided or were left over slightly in the carbon-coated silicon material according to the first example, the following were supported: the silicon existed as the major component; and the carbon definitely existed.

Figure 4:
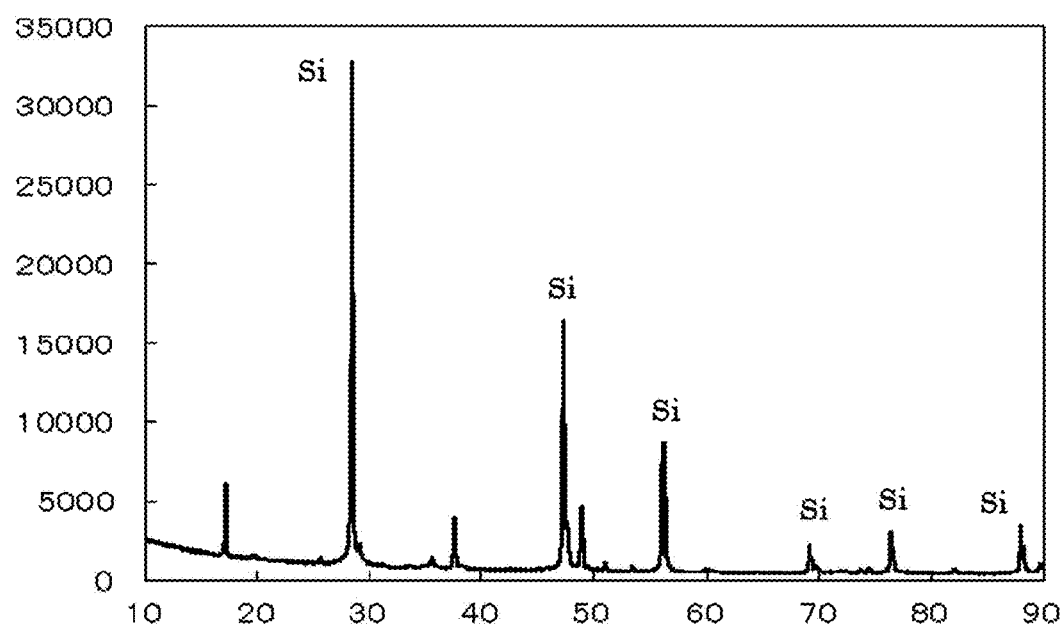
FIG. 4 is an X-ray diffraction chart of the carbon-coated silicon material according to the first example.

The carbon-coated silicon material according to the first example was subjected to an X-ray diffraction measurement which was carried out by a powder X-ray diffraction apparatus. FIG. 4 shows an X-ray diffraction chart of the carbon-coated silicon material according to the first example.

From the X-ray diffraction chart in FIG. 4, peaks indicating silicon crystals were ascertained. In the X-ray diffraction chart in FIG. 4, the peaks identified with "Si" are peaks derived from silicon, whereas the other peaks are peaks derived from α-FeSi$_2$ included in CaSi$_2$, one of the raw materials. From the result, CaSi$_2$ was supported to undergo a reaction to change into the silicon material.

The foregoing results according to the first evaluative example supported that the carbon-coated silicon material including silicon crystals was produced from out of CaSi$_2$ by the production process according to the present invention.

Second Evaluative Example

Figure 5:
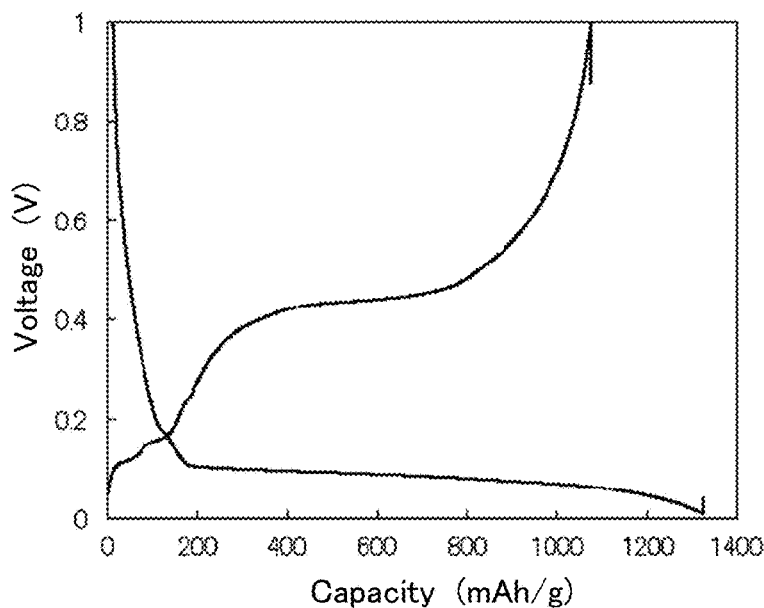
FIG. 5 shows initial charging and discharging curves of a lithium-ion secondary battery according to the first example.

The lithium-ion secondary battery according to the first example, and the lithium-ion secondary battery according to the first comparative example were subjected to a discharging mode or operation which was carried out with a current of 0.2 mA and at a temperature of 25° C. until a voltage of the evaluation electrode became 0.01 V to the counter electrode, and were subsequently subjected to a charging mode or operation which was carried out with a current of 0.2 mA and at a temperature of 25° C. until a voltage of the evaluation electrode became 1 V to the counter electrode. Such values as {("Charged Capacity"/"Discharged Capacity")×100} were computed for the charging and discharging modes or operations, and were labeled as "Initial Efficiency (%)," respectively. Moreover, when the lithium-ion secondary battery according to the first example was subjected to a measurement for an IR drop during a time period of 10 seconds after the charging mode or operation, the result was 0.12 V. Table 3 shows the results on the initial discharged capacities, initial charged capacities and initial efficiencies of the respective lithium-ion secondary batteries. FIG. 5 illustrates the initial charging and discharging curves of the lithium-ion secondary battery according to the first example.

Figure 6:
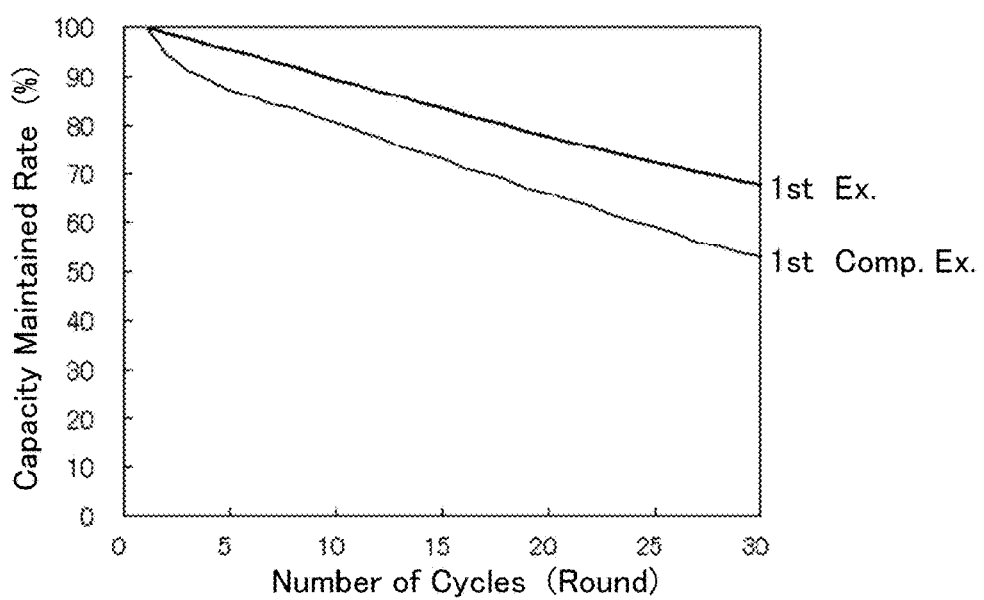
FIG. 6 is a graph of capacity maintained rates which were exhibited by the lithium-ion secondary battery according to the first example and a lithium-ion secondary battery according to a first comparative example against cycles.

In addition, each of the lithium-ion secondary batteries was subjected to cyclic modes or operations which were carried out repeatedly for 30 cycles as follows: a discharging mode or operation which was carried out with a current of 0.2 mA and at a temperature of 25° C. until a voltage of the evaluation electrode became 0.01 V to the counter electrode; after 10 minutes had passed since the discharging mode or operation, a charging mode or operation which was carried out with a current of 0.2 mA and at a temperature of 25° C. until a voltage of the evaluation electrode became 1 V to the counter electrode; and an intermitting or pausing mode or operation for 10 minutes. Such values as [100×{("Post-30-cylcle Charged Capacity")/("Post-1-cycle Charged Capacity")}] were computed, and were labeled as "Capacity Maintained Rate," respectively. Note that, in the second evaluative example, "having Li occlude (or sorb) in the evaluation electrode" is referred to as "discharging," and "having Li release (or desorb) from the evaluation electrode" is referred to as "charging." FIG. 6 illustrates the results.

TABLE 3

|  | Initial Discharged Capacity | Initial Charged Capacity | Initial Efficiency |
|---|---|---|---|
| 1st Ex. | 1,324 mAh/g | 1,075 mAh/g | 81.1% |
| 1st Comp. Ex. | 1,529 mAh/g | 1,255 mAh/g | 82.0% |

The lithium-ion secondary battery according to the first example exhibited an initial efficiency which was equivalent to the initial efficiency of the lithium-ion secondary battery according to the first comparative example. As illustrated in FIG. 5, the charging and discharging curves of the lithium-ion secondary battery according to the first example were charging and discharging curves which were equivalent to the charging and discharging curves of a lithium-ion secondary battery in which silicon crystals served as a negative-electrode active material.

Moreover, from FIG. 6, the lithium-ion secondary battery according to the first example was found out to exhibit a better capacity maintained rate than did the lithium-ion secondary battery according to the first comparative example. Thus, the production process according to the present invention was supported to make suitable carbon-coated silicon materials obtainable.

Figure 7:
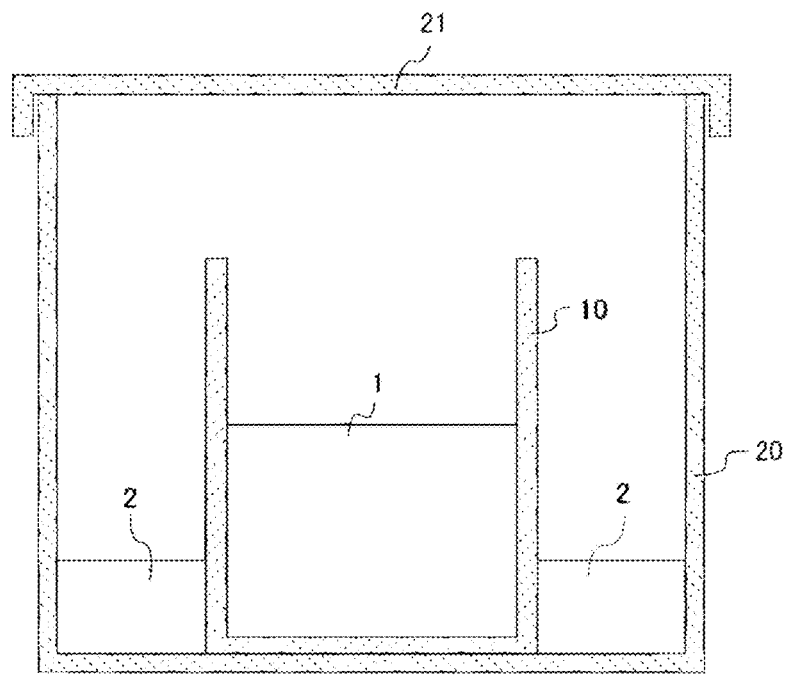
FIG. 7 is a schematic drawing illustrating $CaSi_2$ and polyvinyl chloride put in a non-contacting state in a second example.

Second Example 1-g CaSi$_2$ was put in a first crucible made of alumina, and then the first crucible was further arranged within a second crucible made of alumina and being larger than the first crucible. 1.3-g polyvinyl chloride of which the polymerization degree was 1,100 was put in the second crucible made of alumina, and then a lid was put on the second crucible. The CaSi$_2$ and polyvinyl chloride were in a non-contacting state one another. FIG. 7 illustrates a schematic diagram of the state.

In FIG. 7, "1" designates the $CaSi_2$; "10" designates the first crucible; "2" designates the polyvinyl chloride; "20" designates the second crucible; and "21" designates the lid. A clearance, which makes gases occurring inside the crucibles transferable to the outside of the crucibles, exists between the constituent elements "20" and "21"

The second crucible covered with the lid was put in an electric furnace. After setting up a temperature of the electric furnace at 270° C. in an argon-gas atmosphere, the $CaSi_2$ and polyvinyl chloride were heated at 270° C. for 1 hour. Subsequently, after setting up the temperature of the electric furnace at 900° C., the $CaSi_2$ and polyvinyl chloride were heated at 900° C. for 1 hour to obtain a calcined body. Note that an amount of the black smokes included in the gases occurring during the reactions decreased remarkably, compared with the amount in the first example.

After washing the obtained calcined body with water, the calcined body was further washed with acetone. Subsequently, the calcined body was subjected to reduced-pressure drying to obtain a black-colored carbon-coated silicon material according to a second example.

Third Evaluative Example

Figure 8:
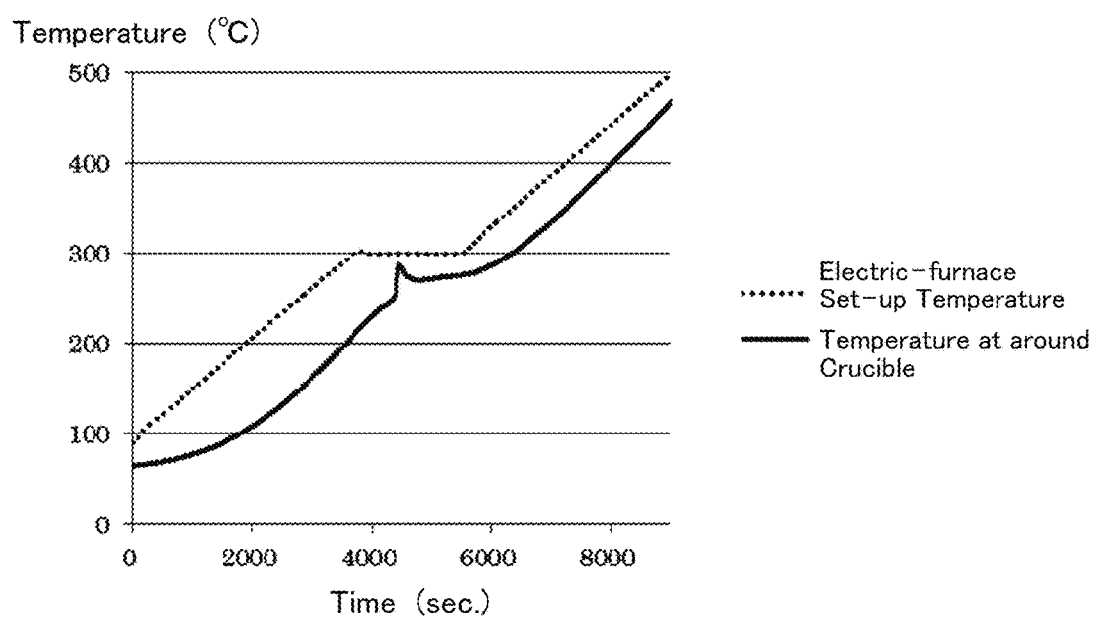
FIG. 8 is a graph illustrating respective temperatures exhibited by the first example in a third evaluative example.
Figure 9:
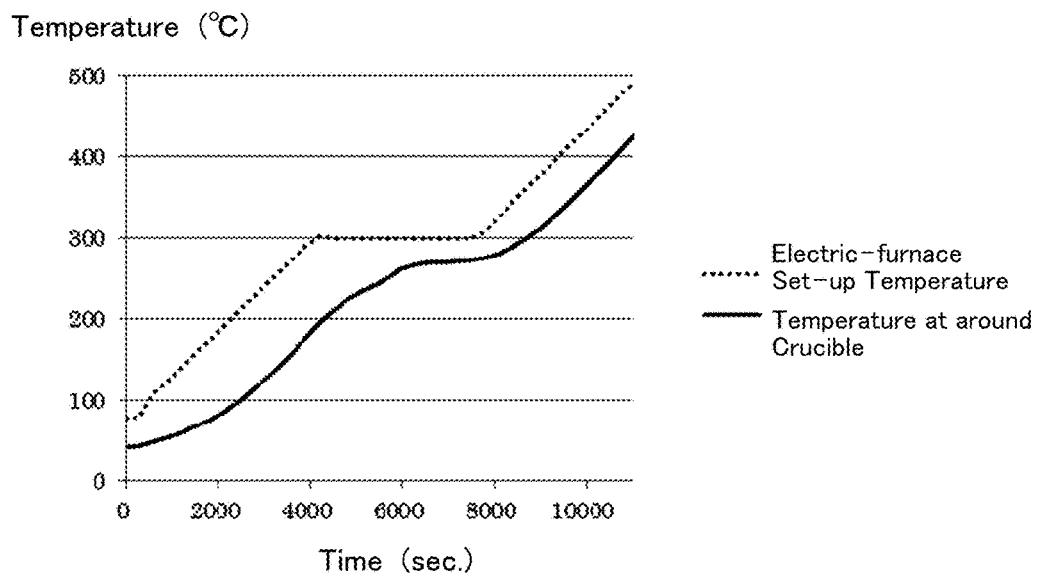
FIG. 9 is a graph illustrating respective temperatures exhibited by the second example in the third evaluative example.

In the first example and second example, the following temperatures were observed instrumentally: the set-up temperature in the electric furnace; and a temperature at around the crucible or crucibles within the furnace. FIG. 8 and FIG. 9 illustrate the instrumental-observation results centering on and around 300° C. in the first example and second example, respectively.

From FIG. 8, surmising is possible that the temperature at around the crucible within the furnace appeared to heighten sharply between 200° C. and 300° C. . The observed temperature rise is inferred to result from a localized heat generation. From FIG. 9, surmising is possible that the temperature at around the crucibles within the furnace appeared to undergo a gentle transition roughly along the set-up temperature.

From the forgoing instrumental-observation results, saying is possible that the localized heat generation was suppressed in the production process according to the second example in which the $CaSi_2$ and polyvinyl chloride were reacted in a non-contacting state. The presence or absence of the aforementioned localized heat generation makes explainable the difference observed between the first example and second example in the amount of the black smokes included in the gases occurring during the reactions. Thus, saying is possible that the production process in which the $CaSi_2$ and polyvinyl chloride are reacted in a non-contacting state is a method making the reactions more likely to be controllable than the other production process is.

Third Example

Except that, as the $CaSi_2$, $CaSi_2$ of which the "$D_{50}$" measured with a laser-diffraction type grain-size distribution meter was 3 μm, a carbon-coated silicon material according to a third example was obtained in the same manner as the first example.

Fourth Example

Except that, as the $CaSi_2$, $CaSi_2$ of which the "$D_{50}$" measured with a laser-diffraction type grain-size distribution meter was 3 μm, a carbon-coated silicon material according to a third example was obtained in the same manner as the second example.

Fourth Evaluative Example

The carbon-coated silicon materials according to the third example and fourth example were subjected to a measurement of the grain-size distributions with a laser-diffraction type grain-size distribution meter. Table 4 shows the results.

TABLE 4

|  | "$D_{50}$" | "$D_{90}$" |
| --- | --- | --- |
| 3rd Ex. | 14.0 μm | 37.6 μm |
| 4th Ex. | 3.2 μm | 7.5 μm |

The carbon-coated silicon material according to the fourth example in which the $CaSi_2$ and polyvinyl chloride were reacted in a non-contacting state had the "$D_{50}$" which was equivalent to the "$D_{50}$" of the $CaSi_2$ in one of the raw materials. Hence, in the production process in which $CaSi_2$ and polyvinyl chloride are reacted in anon-contacting state, saying is possible that the grain-size distribution of the raw material is reflected in the grain-size distribution of the carbon-coated silicon material.

On the other hand, the carbon-coated silicon material according to the third example in which the $CaSi_2$ and polyvinyl chloride were reacted in a contacting state had the "$D_{50}$" which was larger than the "$D_{50}$" of the $CaSi_2$ in one of the raw materials. Hence, in the production process in which $CaSi_2$ and polyvinyl chloride are reacted in a contacting state, saying is possible that the carbon-coated silicon material is produced in such a large size as an agglomerated state of multiple particles.

From the above results, saying is possible that, in the production process according to the present invention, the forms of the production process enable carbon-coated silicon materials having desired grain-size distributions to be made distinctively or individually one by one. Moreover, when producing a carbon-coated silicon material of which the particle size is small, the method in which $CaSi_2$ and polyvinyl chloride are reacted in a non-contacting state is selected preferably after the $CaSi_2$, one of the raw materials, has been pulverized to a desired size, because pulverizing the obtained carbon-coated silicon material later is not needed at all.

Fifth Example

Except that, as the $CaSi_2$, $CaSi_2$ of which the "$D_{50}$" measured with a laser-diffraction type grain-size distribution meter was 10 μm, a carbon-coated silicon material according to a fifth example was obtained in the same manner as the first example.

Sixth Example

Except that, as the $CaSi_2$, $CaSi_2$ of which the "$D_{50}$" measured with a laser-diffraction type grain-size distribution meter was 250 μm, a carbon-coated silicon material according to a sixth example was obtained in the same manner as the first example.

Fifth Evaluative Example

The carbon-coated silicon materials according to the third example, fifth example and sixth example were subjected to a Ca-amount analysis which was carried out using a fluorescent X-ray analyzer. Table 5 shows the results.

TABLE 5

|  | "$D_{50}$" of $CaSi_2$ | Ca Amount (% by mass) |
|---|---|---|
| 3rd Ex. | 3 μm | 0.91 |
| 5th Ex. | 10 μm | 1.83 |
| 6th Ex. | 250 μm | 13.4 |

Moreover, when the carbon-coated silicon materials according to the third example, fifth example and sixth example were analyzed by a powder X-ray diffraction apparatus, the $CaSi_2$ was revealed to reside or be left over slightly in a substantially identical amount even in any of the materials. The result of the analysis is inferred to mean that whether the particle diameter of the $CaSi_2$ was large or small did not have any particular influence on the progressing degree of the reactions.

If so, the differences between the Ca amounts included in the carbon-coated silicon materials as shown in Table 5 are inferred to result from the extent of Ca removal by the washing with water after the reactions had been completed. That is, the particle diameter of $CaSi_2$ correlates with the particle diameter of obtained carbon-coated silicon material. As a result, the advantageous effects of washing with water are also inferred to differ from each other, because the carbon-coated silicon materials exhibited surface areas which differed from each other when contacting with water in the washing with water. In view of the Ca removal in the carbon-coated silicon materials, saying is possible that the smaller the particle diameter of $CaSi_2$ is the more preferable the $CaSi_2$ is.

Seventh Example

The carbon-coated silicon material according to the first example was put in a rotary kiln-type reactor vessel, and was then subjected to thermal CVD to obtain a carbon-coated silicon material according to a seventh example in which the carbon-coated silicon material according to the first example was further carbon coated additionally. The thermal CVD was carried out under such conditions as at 880° C. and for 30-minute residence time in a propane-gas flow. Note that the reactor vessel had a furnace core tube arranged in the horizontal direction. The furnace core tube was set to rotate at a revolving speed of one rpm. The furnace core tube had a baffle plate arranged on the inner peripheral wall. Thus, the reactor vessel was constructed so as to let contents, which deposited on the baffle plate as the furnace core tube rotated, fall down from the baffle plate at a predetermined height, and accordingly the contents were stirred by the construction.

Except that, instead of the carbon-coated silicon material according to the first example, the carbon-coated silicon material according to the seventh example was used hereinafter, a lithium-ion secondary battery according to the seventh example was obtained in the same manner as the first example.

Sixth Evaluative Example

The lithium-ion secondary batteries according to the first example and seventh example were subjected to cyclic modes or operations which were carried out repeatedly for 50 cycles as follows: a discharging mode or operation which was carried out with a current of 0.2 mA and at a temperature of 25° C. until a voltage of the evaluation electrode became 0.01 V to the counter electrode; after 10 minutes had passed since the discharging mode or operation, a charging mode or operation which was carried out with a current of 0.2 mA and at a temperature of 25° C. until a voltage of the evaluation electrode became 0.8 V to the counter electrode; and an intermitting or pausing mode or operation for 10 minutes. Such a value as [100×{("Post-50-cylcle Charged Capacity")/("Post-1-cycle Charged Capacity")}] was computed, and was labeled as "Capacity Maintained Rate." Note that, in the sixth evaluative example, "having Li occlude (or sorb) in the evaluation electrode" is referred to as "discharging," and "having Li release (or desorb) from the evaluation electrode" is referred to as "charging." FIG. 10 illustrates the results.

Figure 10:
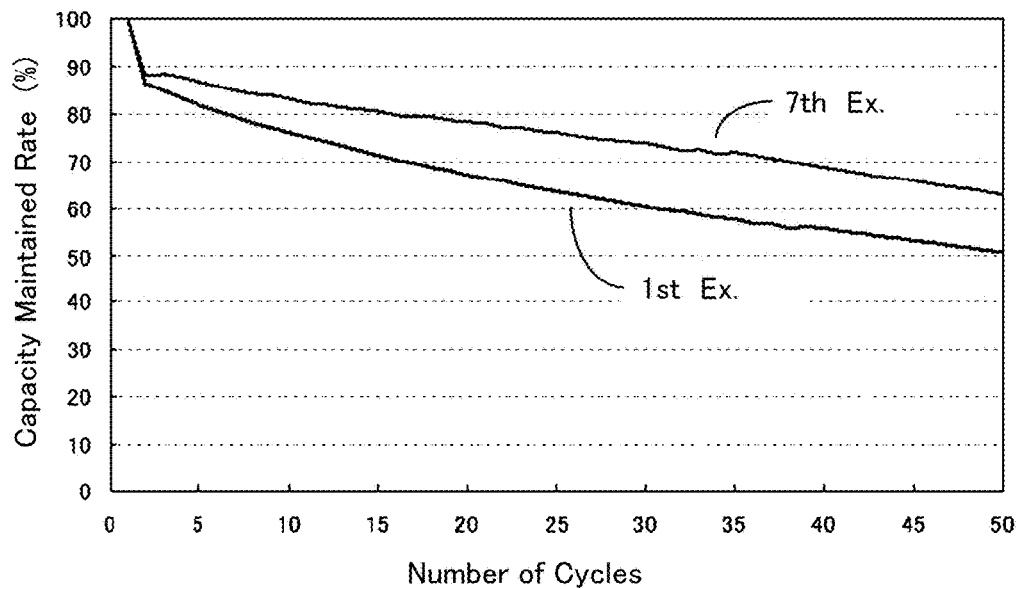
FIG. 10 is a graph of capacity maintained rates which were exhibited by the lithium-ion secondary battery according to the first example and a lithium-ion secondary battery according to a seventh example against cycles.

From the results shown in FIG. 10, the carbon-coated silicon material according to the seventh example, which was made by further carbon coating the carbon-coated silicon material according to the first example, was supported to be capable of maintaining the capacity more suitably to serve as a negative-electrode active material.

Eighth Example

The carbon-coated silicon material according to the first example was heated at 600° C. in the presence of oxygen to partially remove the carbon. The carbon-coated silicon material, from which some of the carbon was removed, was put in a rotary kiln-type reactor vessel, and was then subjected to thermal CVD to obtain a carbon-coated silicon material according to an eighth example. The thermal CVD was carried out under such conditions as at 880° C. and for 30-minute residence time in a propane-gas flow. Note that the reactor vessel was set under the same conditions as the conditions in the seventh example.

Except that, instead of the carbon-coated silicon material according to the first example, the carbon-coated silicon material according to the eighth example was used hereinafter, a lithium-ion secondary battery according to the eighth example was obtained in the same manner as the first example.

Seventh Evaluative Example

A carbon amount in the carbon-coated silicon material according to the eighth example from which the carbon was removed partially was measured by an induction-coupled plasma-emission analyzer. Likewise, a carbon amount in the carbon-coated silicon material according to the first example was measured. As a result, the carbon amount in the carbon-coated silicon material according to the eighth example from which some of the carbon was removed was identified to be 17 when the carbon amount in the carbon-coated silicon material according to the first example was taken as 100.

Eighth Evaluative Example

The lithium-ion secondary batteries according to the seventh example and eighth example were subjected to cyclic modes or operations which were carried out repeatedly for 50 cycles as follows: a discharging mode or operation which was carried out with a current of 0.2 mA and at a temperature of 25° C. until a voltage of the evaluation electrode became 0.01 V to the counter electrode; after 10 minutes had passed since the discharging mode or operation, a charging mode or operation which was carried out with a current of 0.2 mA and at a temperature of 25° C. until a voltage of the evaluation electrode became 0.8 V to the counter electrode; and an intermitting or pausing mode or operation for 10 minutes. Such a value as [100×{("Post-50-cylcle Charged Capacity")/("Post-1-cycle Charged Capacity")}] was computed, and was labeled as "Capacity Maintained Rate." Note that, in the eighth evaluative example, "having Li occlude (or sorb) in the evaluation electrode" is referred to as "discharging," and "having Li release (or desorb) from the evaluation electrode" is referred to as "charging." Table 6 shows the results. Note that the values of the initial-capacity rate were values when the first-cycle charged capacity of the seventh example was taken as 100.

TABLE 6

|  | Initial-capacity Rate | Capacity Maintained Rate |
|---|---|---|
| 7th Ex. | 100 | 63% |
| 8th Ex. | 116 | 65% |

From the results shown in Table 6, saying is possible that the carbon-coated silicon material according to the eighth example had a larger capacity than did the carbon-coated silicon material according to the seventh example when being used as a negative-electrode active material. In the production process according to the eighth example, carbon was removed partially. As accompanied by such carbon removal, impurities which were included in the carbon-coated silicon material so as to be inconvenient or disadvantageous for charging and discharging were removed simultaneously. As a result, in the carbon-coated silicon material according to the eighth example, the capacity is surmised to have augmented when the carbon-coated silicon material was used as a negative-electrode active material.

Ninth Example 1-g CaSi$_2$ and 1.3-g polyvinyl chloride of which the polymerization degree was 1,100 were mixed to make a mixture. The molar ratio between Ca and Cl was 1:2 in the mixture. The mixture was put in a crucible made of alumina in an argon atmosphere. Then, the crucible was covered with a lid, and was then arranged within an electric furnace. In order to obtain a calcined body, the mixture was subjected to a temperature increase in which a temperature of the electric furnace was raised in the following manner: from room temperature to 250° C. at a rate of 5° C. /min; subsequently from 250° C. to 350° C. at a rate of 1.67° C./min; and further from 350° C. to 600° C. at a rate of 5° C./min.

After dispersing 1.5 g of the obtained calcined body in 100-mL water to wash, the calcined body was filtered and was then subjected to reduced-pressure drying to obtain a black-colored carbon-coated silicon material according to a ninth example.

Tenth Example

Except that the obtained calcined body was dispersed in a mixed solvent of 100-mL water and 10-mL ethanol to wash, a black-colored carbon-coated silicon material according to a tenth example was obtained in the same manner as the ninth example.

Ninth Evaluative Example

The carbon-coated silicon materials according to the ninth example and tenth example were subjected a fluorescent X-ray analysis to analyze the Ca amounts in the materials. The Ca amount was 2.8% by mass in the carbon-coated silicon material according to the ninth example, whereas the Ca amount was 1.8% by mass in the carbon-coated silicon material according to the tenth example. Using the mixed solvent of water and the other solvent as the washing solvent is believed to result in upgrading the dispersibility of the carbon-coated silicon material within the washing solvent; as a result, to lead to making Ca removable suitably.

The invention claimed is:

1. A production process for carbon-coated silicon material, the production process comprising the step of:
   letting CaSi$_2$ and a halogen-containing polymer coexist under a noncontact condition and then heating the CaSi$_2$ and the halogen-containing polymer at a temperature being a carbonization temperature or more of the halogen-containing polymer while the CaSi$_2$ and the halogen-containing polymer coexist under the noncontact condition to obtain a carbon-coated silicon material.

2. The production process for carbon-coated silicon material as set forth in claim 1, wherein the heating is done by multistage heating including the steps of:
   heating the halogen-containing polymer and CaSi$_2$ at a temperature being a decomposition temperature or more of the halogen-containing polymer; and
   heating the halogen-containing polymer and CaSi$_2$ at a temperature being a carbonization temperature or more of post-decomposition polymers.

3. The production process for carbon-coated silicon material as set forth in claim 1, wherein the halogen-containing polymer comprises a monomer unit according to Formula (1) shown below:

Formula (1)

wherein, in Formula (1), "R$^1$" is a trivalent-or-more hydrocarbon group; each "X" is independently a halogen; and "n" is an integer of one or more.

4. The production process for carbon-coated silicon material as set forth in claim 1, wherein the halogen-containing polymer comprises a monomer unit according to Formula (2) shown below:

Formula (2)

wherein, in Formula (2), each of "R$^2$," "R$^3$" and "R$^4$" is independently at least one member selected from the group consisting of monovalent hydrocarbon groups, halogen-substituted hydrocarbon groups, hydrogen and halogens; and "X" is a halogen.

5. The production process for carbon-coated silicon material as set forth in claim 1, wherein the CaSi$_2$ has an average particle diameter falling within a range of from 0.1 to 50 μm.

6. The production process for carbon-coated silicon material as set forth in claim 1, further comprising an additional carbon coating step of further coating carbon onto the carbon-coated silicon material.

7. The production process for carbon-coated silicon material as set forth in claim 6 further comprising a carbon removal step of removing at least some carbon on the carbon-coated silicon material before the additional carbon coating step.

8. A manufacturing process for secondary battery comprising the steps of:
   obtaining a carbon-coated silicon material by performing the production process for carbon-coated silicon material as set forth in claim 1, and
   manufacturing a negative electrode using the carbon-coated silicon material.

9. A production process for carbon-coated silicon material, the production process comprising the step of:
   heating CaSi$_2$ and a halogen-containing polymer at a temperature being a carbonization temperature or more of the halogen-containing polymer in a state where the CaSi$_2$ and the halogen-containing polymer coexist to obtain a carbon-coated silicon material, and
   further comprising an additional carbon coating step of further coating carbon onto the carbon-coated silicon material.

10. The production process for carbon-coated silicon material as set forth in claim 9, wherein the step includes a step of mixing the halogen-containing polymer with the CaSi$_2$ and then heating a mixture of the halogen-containing polymer and CaSi$_2$ at a temperature being the carbonization temperature or more of the halogen-containing polymer.

11. The production process for carbon-coated silicon material as set forth in claim 9, wherein the heating is done by multistage heating including the steps of:
   heating the halogen-containing polymer and CaSi$_2$ at a temperature being a decomposition temperature or more of the halogen-containing polymer; and
   heating the halogen-containing polymer and CaSi$_2$ at a temperature being a carbonization temperature or more of post-decomposition polymers.

12. The production process for carbon-coated silicon material as set forth in claim 9, wherein the halogen-containing polymer comprises a monomer unit according to Formula (1) shown below:

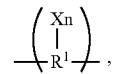

Formula (1)

wherein, in Formula (1), "R$^1$" is a trivalent-or-more hydrocarbon group; each "X" is independently a halogen; and "n" is an integer of one or more.

13. The production process for carbon-coated silicon material as set forth in claim 9, wherein the halogen-containing polymer comprises a monomer unit according to Formula (2) shown below:

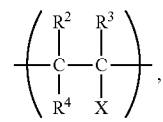

Formula (2)

wherein, in Formula (2), each of "R$^2$," "R$^3$" and "R$^4$" is independently at least one member selected from the group consisting of monovalent hydrocarbon groups, halogen-substituted hydrocarbon groups, hydrogen and halogens; and "X" is a halogen.

14. The production process for carbon-coated silicon material as set forth in claim 9, wherein the CaSi$_2$ has an average particle diameter falling within a range of from 0.1 to 50 μm.

15. The production process for carbon-coated silicon material as set forth in claim 9 further comprising a carbon removal step of removing at least some carbon on the carbon-coated silicon material before the additional carbon coating step.

16. A manufacturing process for secondary battery comprising the steps of:
   obtaining a carbon-coated silicon material by performing the production process for carbon-coated silicon material as set forth in claim 9, and
   manufacturing a negative electrode using the carbon-coated silicon material.

* * * * *